United States Patent
Lee et al.

(10) Patent No.: US 11,902,974 B2
(45) Date of Patent: Feb. 13, 2024

(54) METHOD AND APPARATUS FOR TRANSMITTING AND RECEIVING WIRELESS SIGNALS IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/903,776

(22) Filed: Sep. 6, 2022

(65) Prior Publication Data

US 2023/0049784 A1    Feb. 16, 2023

Related U.S. Application Data

(63) Continuation of application No. PCT/KR2021/010213, filed on Aug. 4, 2021.
(Continued)

(51) Int. Cl.
*H04L 1/1812*    (2023.01)
*H04W 72/1273*   (2023.01)
*H04W 72/23*     (2023.01)

(52) U.S. Cl.
CPC ....... *H04W 72/1273* (2013.01); *H04L 1/1812* (2013.01); *H04W 72/23* (2023.01)

(58) Field of Classification Search
CPC .......... H04W 72/0446; H04W 56/003; H04W 56/0045; H04W 88/02; H04W 72/1273;
(Continued)

(56) References Cited

U.S. PATENT DOCUMENTS 11,121,821 B2 *   9/2021   Wikström ............. H04L 1/0075
11,206,655 B2 *  12/2021   Moon .................. H04L 1/0072
(Continued)

FOREIGN PATENT DOCUMENTS

| KR | 1020180018989 A | 2/2018 |
| KR | 1020180102974 A | 9/2018 |
| WO | 2020141994 A1   | 7/2020 |

*Primary Examiner* — Hanh N Nguyen
(74) *Attorney, Agent, or Firm* — BRYAN CAVE LEIGHTON PAISNER LLP

(57) ABSTRACT

A terminal according to one embodiment of the present invention may: receive first DCI including a first HARQ process ID field and a first NDI field on the basis of a first RNTI for a terminal group; receive a first PDSCH scheduled by the first DCI; receive second DCI on the basis of a second RNTI dedicated to the terminal in a state in which a data block of the first PDSCH has not been successfully decoded; and receive a second PDSCH scheduled by the second DCI, wherein a second HARQ process ID field included in the second DCI indicates the same HARQ process as the first HARQ process ID field included in the first DCI; and, on the basis of the fact that a value of a second NDI field included in the second DCI is the same as the value of the first NDI field included in the first DCI, a data block of the second PDSCH may be decoded on the assumption that the second PDSCH includes retransmission for the data block of the first PDSCH that has not been successfully decoded, notwithstanding that the second RNTI is different from the first RNTI.

12 Claims, 12 Drawing Sheets

Related U.S. Application Data

(60) Provisional application No. 63/062,360, filed on Aug. 6, 2020.

(58) Field of Classification Search
CPC .. H04W 72/23; H04W 28/04; H04L 27/2646; H04L 27/2655; H04L 27/26; H04L 13/00; H04L 1/1812; H04L 1/1845; H04L 1/1864; H04L 1/1822; H04L 5/0044; H04L 5/0053; H04L 1/004
See application file for complete search history.

(56) References Cited

U.S. PATENT DOCUMENTS

| | | | |
|---|---|---|---|
| 11,374,694 B2 * | 6/2022 | Nam | H04W 28/06 |
| 11,395,260 B2 * | 7/2022 | Liu | H04L 1/1896 |
| 11,632,740 B2 * | 4/2023 | Yerramalli | H04W 28/04 370/330 |
| 2013/0315124 A1 | 11/2013 | Rapaport et al. | |
| 2018/0092071 A1 | 3/2018 | Dinan et al. | |
| 2020/0008097 A1 | 1/2020 | Fujishiro et al. | |
| 2020/0204972 A1 | 6/2020 | Park et al. | |
| 2020/0314727 A1 * | 10/2020 | Xu | H04W 40/32 |
| 2020/0351933 A1 * | 11/2020 | Nam | H04W 72/23 |
| 2022/0045803 A1 * | 2/2022 | Lin | H04L 1/1822 |
| 2022/0239417 A1 * | 7/2022 | Cheng | H04L 1/1896 |
| 2023/0057476 A1 * | 2/2023 | Li | H04L 1/1861 |
| 2023/0070974 A1 * | 3/2023 | Huang | H04L 5/0055 |

* cited by examiner

Non - interleaved CCE - to - REG mapping

METHOD AND APPARATUS FOR TRANSMITTING AND RECEIVING WIRELESS SIGNALS IN WIRELESS COMMUNICATION SYSTEM

This application is the Continuation Bypass of International Application No. PCT/KR2021/010213, filed on Aug. 4, 2021, which claims the benefit of U.S. Provisional Application No. 63/062,360, filed on Aug. 6, 2020 the contents of which are all hereby incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for receiving a signal by a user equipment (UE) in a wireless communication system. The method may include based on a first radio network temporary identifier (RNTI) for a UE group, receiving first downlink control information (DCI) including a first hybrid automatic repeat request (HARQ) process ID field and a first new data indicator (NDI) field; receiving a first physical downlink shared channel (PDSCH) scheduled by the first DCI; receiving second DCI based on a second RNTI dedicated to the UE in a state where a data block of the first PDSCH has not been successfully decoded; and receiving a second PDSCH scheduled by the second DCI. Based on that a second HARQ process ID field included in the second DCI indicates the same HARQ process as the first HARQ process ID field included in the first DCI, and a value of a second NDI field included in the second DCI is equal to a value of the first NDI field included in the first DCI, the UE may decode a data block of the second PDSCH, by assuming that the second PDSCH includes retransmission for the data block of the first PDSCH that has not been successfully decoded, even though the second RNTI is different from the first RNTI.

The first RNTI may be a group-RNTI (G-RNTI), and the second RNTI may be a cell-RNTI (C-RNTI) for uniquely identifying the UE in a cell.

A cyclic redundancy check (CRC) of the first DCI may be scrambled with the G-RNTI, and a CRC of the second DCI may be scrambled with the C-RNTI.

The first DCI and the second DCI may be received through physical downlink control channels (PDCCHs) of different search spaces.

On an assumption that the second PDSCH includes retransmission for the data block of the first PDSCH that has not been successfully decoded, the UE may perform soft combining of the data block of the second PDSCH with the data block of the first PDSCH that has not been successfully decoded.

On an assumption that the second PDSCH includes retransmission of the data block of the first PDSCH that has not been successfully decoded, the UE may perform soft combining of the data block of the second PDSCH with the data block of the first PDSCH that are not successfully decoded, based on the second DCI including a specific indicator.

The soft combining may be performed only when the specific indicator is included in the second DCI.

Even when the second PDSCH includes retransmission for the data block of the first PDSCH that has not been successfully decoded, the UE may decode the data block of the second PDSCH without soft combining of the data block of the second PDSCH with the data block of the first PDSCH based on that the second DCI does not include a specific indicator.

Each of the data blocks may be a transport block (TB) or a code block group (CBG).

In another aspect of the present disclosure, a computer-readable recording medium having recorded thereon a program for carrying out the signal reception method may be provided.

In another aspect of the present disclosure, a user equipment (UE) for carrying out the signal reception method may be provided.

In another aspect of the present disclosure, a device for controlling a user equipment (UE) for carrying out the signal reception method may be provided.

In another aspect of the present disclosure, provided herein is a method for transmitting a signal by a base station in a wireless communication system. The method may include based on a first radio network temporary identifier (RNTI) for a UE group, transmitting first downlink control information (DCI) including a first hybrid automatic repeat request (HARQ) process ID field and a first new data indicator (NDI) field; transmitting a first physical downlink shared channel (PDSCH) scheduled by the first DCI; transmitting second DCI based on a second RNTI dedicated to a user equipment (UE) in a state where an acknowledgement (ACK) for a data block of the first PDSCH is not received from the UE; and transmitting a second PDSCH scheduled by the second DCI. Based on the second PDSCH including retransmission for the data block of the first PDSCH, the base station may set a second HARQ process ID field included in the second DCI to the same HARQ process as the first HARQ process ID field included in the first DCI, and set a value of a second NDI field included in the second DCI to a value of the first NDI field included in the first DCI, wherein a cyclic redundancy check (CRC) of the second DCI may be scrambled with the second RNTI different from the first RNTI used for scrambling of a CRC of the first DCI.

In another aspect of the present disclosure, a base station for performing the signal transmission method may be provided.

Advantageous Effects

According to an embodiment of the present disclosure, when retransmission of downlink data scheduled and transmitted on a UE group basis is needed, the retransmission may be performed more efficiently by scheduling and transmitting the retransmission on an individual terminal basis instead of the UE group basis.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

MODE FOR INVENTION

Figure 1:
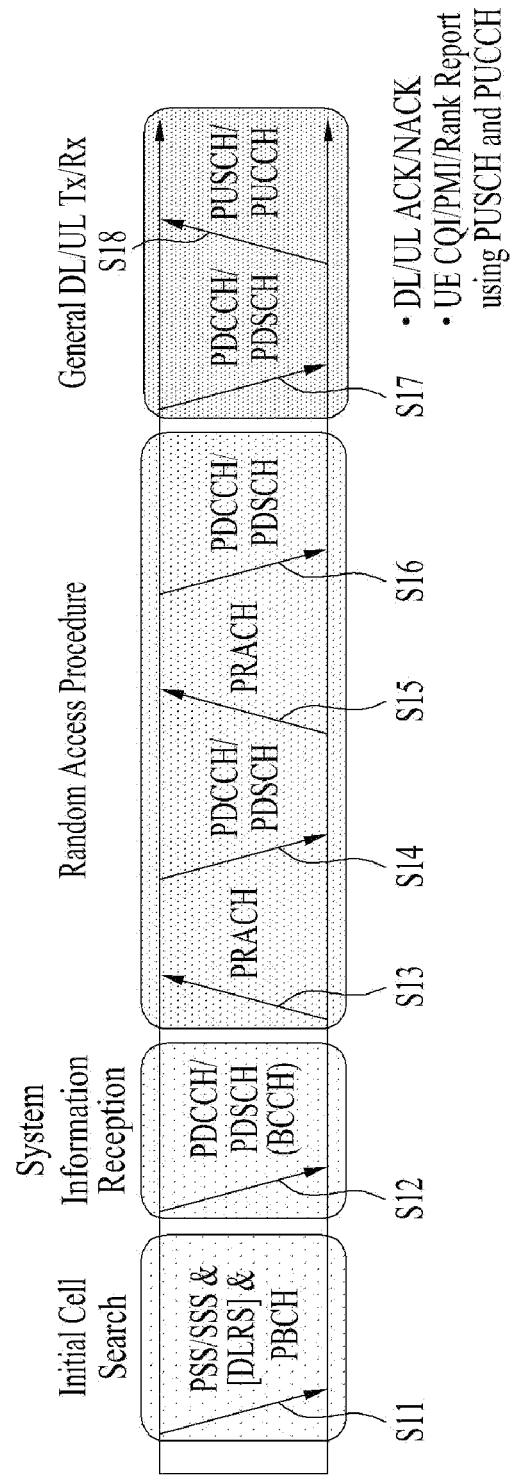
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

The following documents may be referred to for background description, terminology definitions, abbreviations, and the like related to the present disclosure.

3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification
Abbreviations and Terms
PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator COT Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service
Msg3: Message transmitted on UL-SCH containing a C-RNTI MAC CE or CCCH SDU, associated with the UE contention resolution, as part of a random access procedure.
Special Cell: For dual connectivity operation, the term special cell refers to the PCell of the MCG or the PSCell of the SCG depending on whether the MAC entity is associated with the MCG or the SCG. Otherwise, the term special cell refers to the PCell. The special cell supports PUCCH transmission and contention-based random access, and is always activated.
Serving Cell: A PCell, a PSCell, or an SCell
MBSFN Synchronization Area: (In case of an LTE network) an area of the network where all eNodeBs can be synchronized and perform MBSFN transmissions. MBSFN synchronization areas are capable of supporting one or more MBSFN areas. On a given frequency layer, an eNodeB can only belong to one MBSFN synchronization area. MBSFN synchronization areas are independent from the definition of MBMS service areas.
MBSFN transmission or a transmission in MBSFN mode: a simultaneous broadcast scheme performed by transmitting the same waveforms at the same time from multiple cells. An MBSFN transmission from multiple cells within the MBSFN area is seen as a single transmission by a UE.
MBSFN Area: an MBSFN area consists of a group of cells within an MBSFN synchronization area of a network, which are co-ordinated for MBSFN. Except for the MBSFN area reserved cells, all cells within the MBSFN area contribute to the MBSFN transmission and advertise availability of MBSFN. The UE may only need to consider a subset of the configured MBSFN area (i.e., service(s) of interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
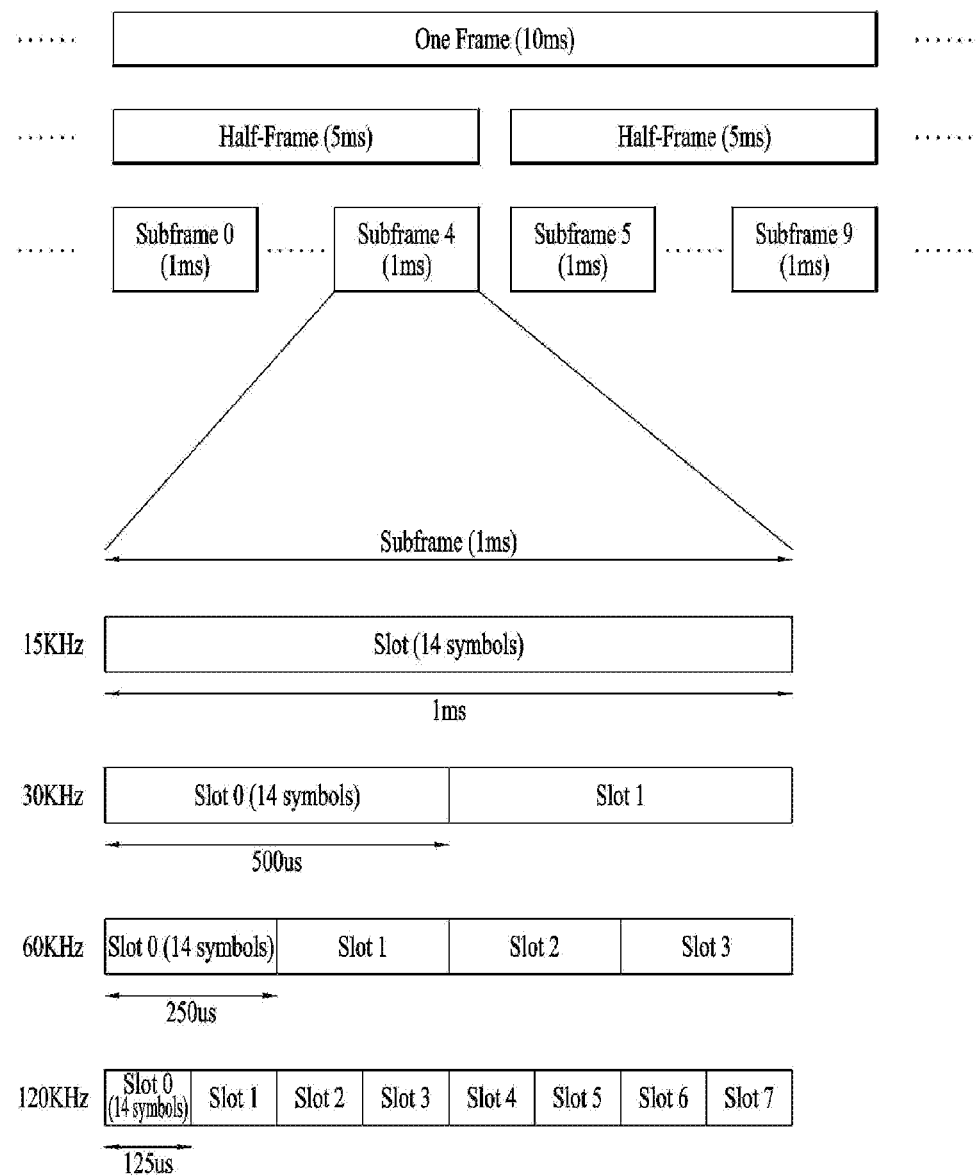
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
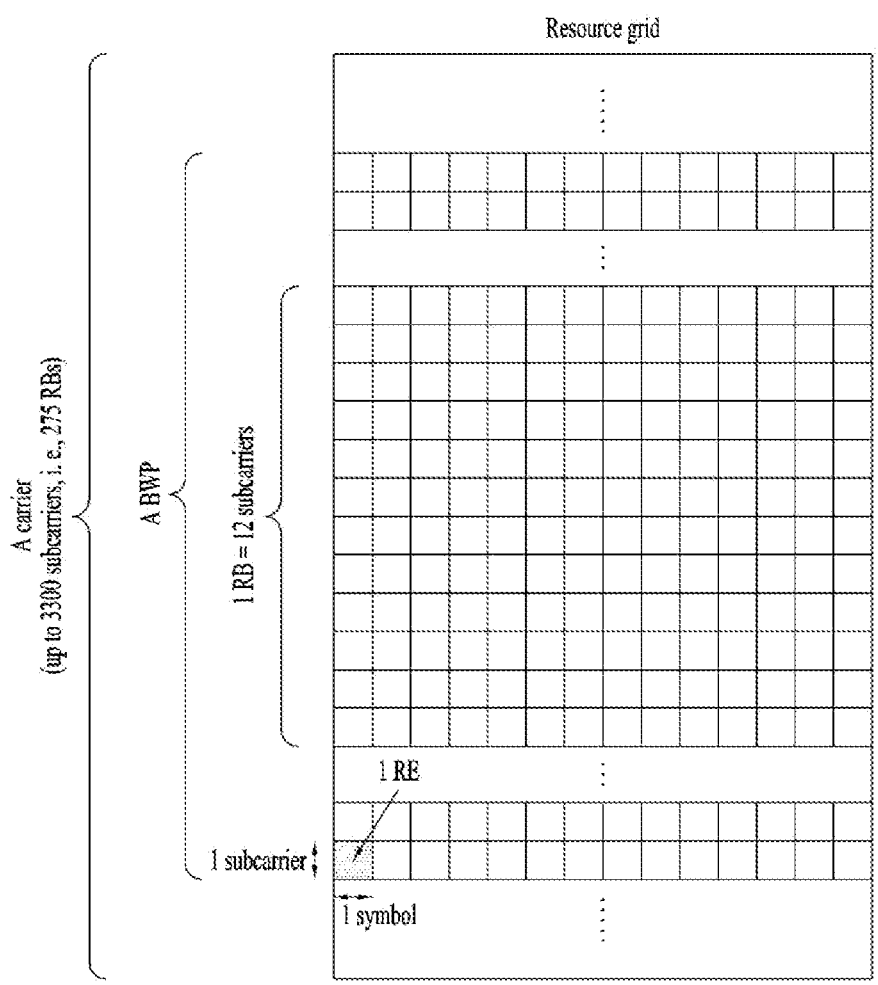
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
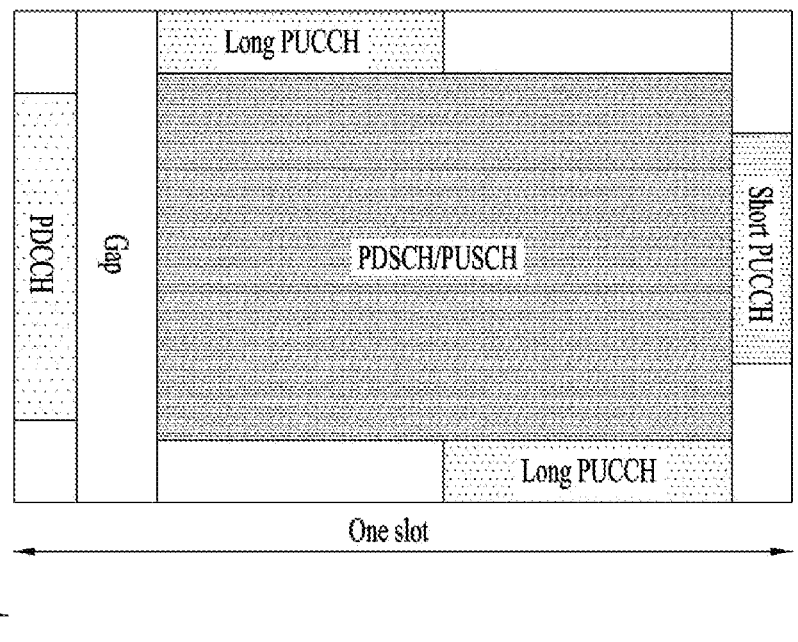
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
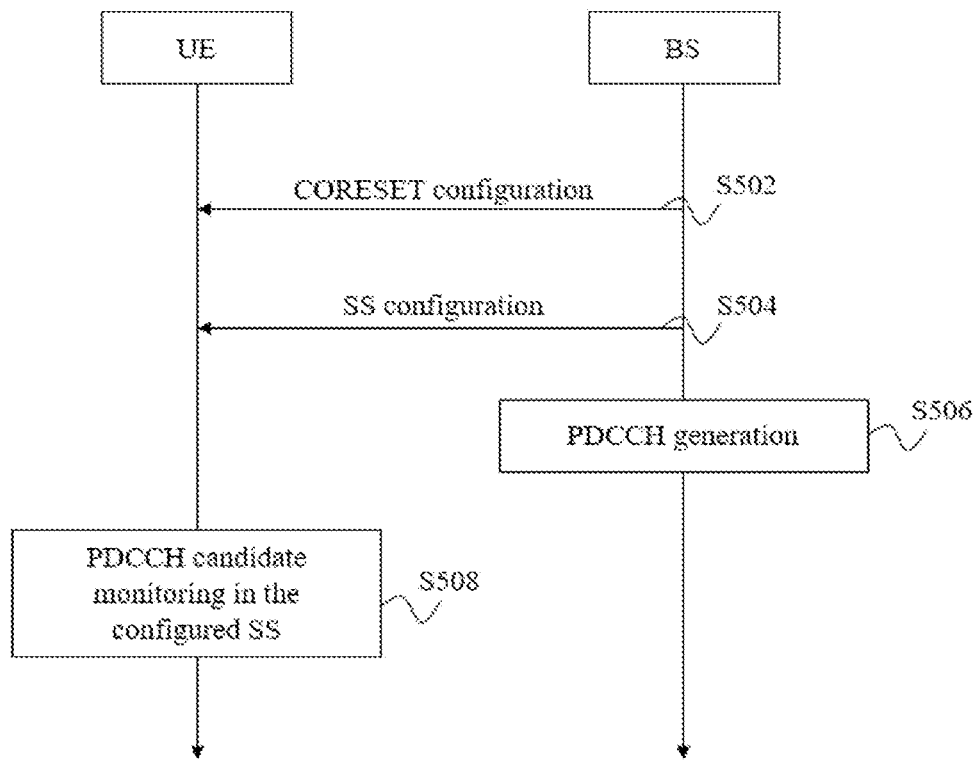
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 3-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
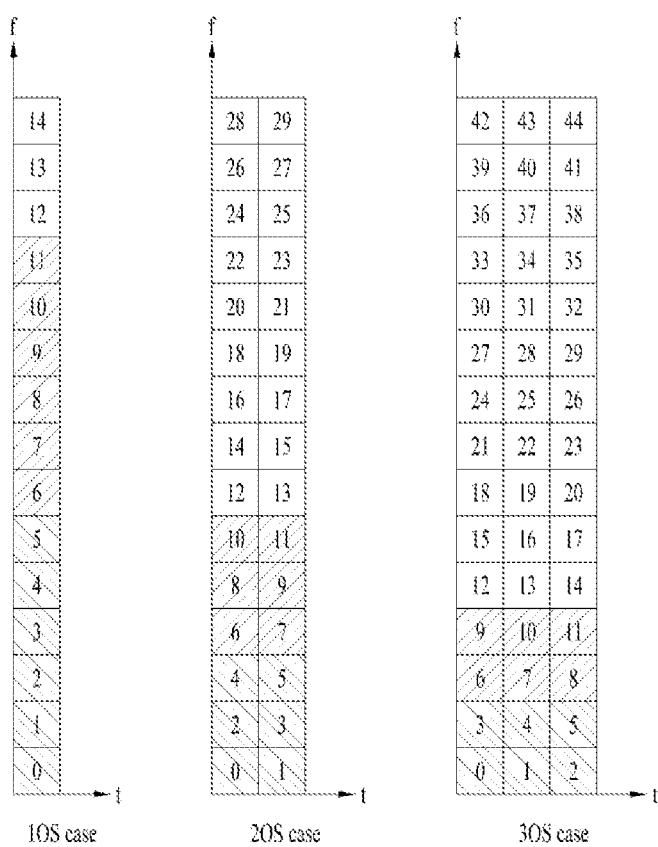
FIGS. 6 and 7 illustrate exemplary control resource set (CORESET) structures.
Figure 7:
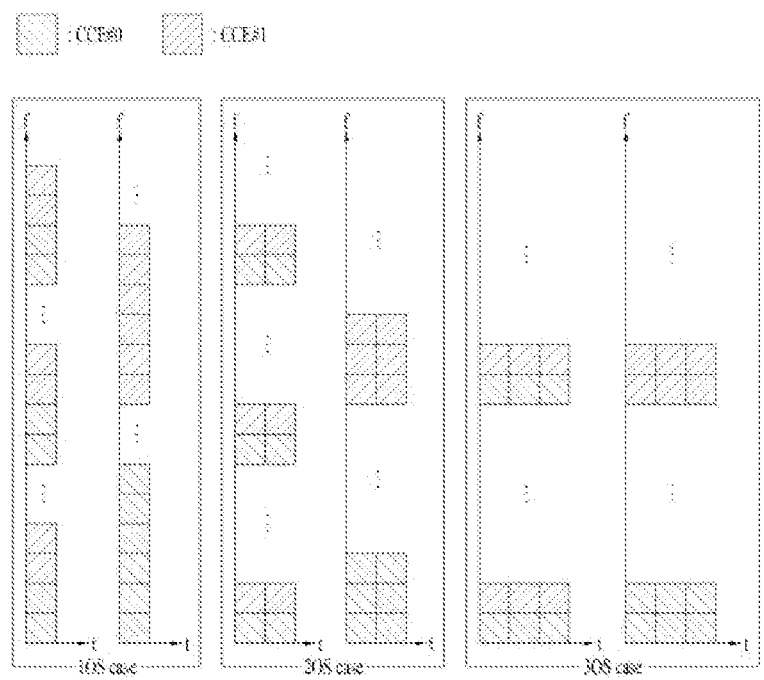

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

MBMS (Multimedia Broadcast/Multicast Service)

Next, the MBMS scheme of 3GPP LTE will be described. 3GPP MBMS may be divided into an SFN scheme, in which multiple BS cells are synchronized to transmit the same data on the PMCH, and a single cell point to multipoint (SC-PTM) scheme, in which multiple BS cells are synchronized to broadcast within a corresponding cell coverage on the PDCCH/PDSCH. The SFN scheme is used to provide a broadcast service in a wide area (e.g. MBMS area) through resources pre-allocated semi-statically, while the SC-PTM scheme is mainly used to provide a broadcast service only within a cell coverage through dynamic resources.

The SC-PTM provides one logical channel SC-MCCH (Single Cell Multicast Control Channel) and one or more logical channels SC-MTCHs (Single Cell Multicast Traffic Channels). These logical channels are mapped to a transmission channel DL-SCH and a physical channel PDSCH. The PDSCH carrying SC-MCCH or SC-MTCH data is scheduled on a PDCCH indicated by G-RNTI. In this case, a TMGI corresponding to a service ID may be mapped to a specific G-RNTI value in a one-to-one correspondence manner. Accordingly, when the BS provides a plurality of services, a plurality of G-RNTI values may be allocated for SC-PTM transmission. One or more UEs may perform PDCCH monitoring using a specific G-RNTI to receive a specific service. Here, an SC-PTM dedicated DRX on-duration period may be configured for the specific service/specific G-RNTI. In this case, the UEs wake up only in a specific on-duration period to perform PDCCH monitoring for the G-RNTI.

The above-described configurations (3GPP system, frame structure, NR system, etc.) may be applied in combination with methods proposed in an embodiment of the present disclosure, or may be supplemented to clarify the technical features of the methods proposed in an embodiment of the present disclosure. As used herein, "/" may mean "and," "or," or "and/or" depending on the context.

The NR UE supports beamforming-based reception in downlink reception. That is, the UE receives a downlink signal using a specific beam among a plurality of candidate beams. In particular, when the UE is in the connected mode, the BS and the UE may maintain an optimal beam for the UE through the BM procedure. Therefore, the BS transmits the PDCCH/PDSCH using the optimal TX beam suitable for the UE, and the UE receives the PDCCH/PDSCH through the optimal RX beam.

REL-17 NR intends to introduce a DL broadcast or DL multicast transmission scheme to support the MBMS service. A point-to-multipoint (PTM) transmission scheme such as MBMS enables transmission to multiple UEs with one DL broadcast/multicast transmission, thereby saving radio resources for each UE compared to individual DL unicast transmission (i.e., point-to-point transmission). Hereinafter, DL/UL BWP(s) is assumed as an example of a frequency band related to the MBMS service. However, the present disclosure is not limited to the term "BWP" and the term DL/UL BWP(s) may be interpreted as intended to cover various frequency sizes/resources corresponding to parts of the entire DL/UL frequency band. For example, a UE-common (BWP frequency) resource on which the MBMS service is provided may be referred to simply as a common frequency resource (CFR).

However, when PTM transmission is performed based on beamforming, a different optimal beam is given for each UE. In particular, when a UE is in the idle or inactive mode, it is difficult for the BS to determine an optimal beam for the UE. Therefore, when the BS transmits the same transport block (TB) to a plurality of UEs, it is difficult to transmit the PDCCH/PDSCH through the optimal beam(s) that multiple UEs satisfy simultaneously.

Accordingly, in an embodiment of the present invention, a method for transmission or retransmission of a broadcast and multicast transport block TB by a BS and a UE based on a service/group-based RNTI (G-RNTI) and a UE-specific RNTI (C-RNTI).

According to an embodiment of the present disclosure, the BS may operate as follows.

The BS may configure one or more CORSET/MSS sets for group scheduling with a G-RNTI and may configure one or more CORSET/CS S sets or one or more CORSET/US S sets for UE specific scheduling with a C-RNTI for a broadcast/multicast service data unit.
a. The CSS may be a Type3 PDCCH CSS set.
b. The MSS may be an MBMS specific search space set.
The BS may select one, two or three of CORSET/MSS sets, CORSET/CSS sets and/or CORSET/US S sets for transmission or retransmission of the data unit based on feedback from one or more UEs.
c. The feedback may include one or more of HARQ feedback to the TB, CSI reporting and beam reporting.

According to an embodiment of the present disclosure, the UE may operate as follows.

The UE may receive configuration of one or more CORSET/MSS sets for group scheduling with a G-RNTI and may receive configuration of one or more CORSET/CSS sets or one or more CORSET/US S sets for UE specific scheduling with a C-RNTI for reception of first and second broadcast/multicast service data units.
The UE may monitor one of the CORSET/MSS sets with the G-RNTI and receive a transmission of the first data unit.
The UE may monitor one of the CORSET/CSS sets or the CORSET/USS sets with the C-RNTI and receive a retransmission of the first data unit or a transmission of the second data unit.
The UE may combine the transmission and the retransmission of the first data unit and decode the TB to acquire the first data unit.

Transmitting Side (e.g., BS):

In an embodiment of the present disclosure, the BS provides a search space set for the MBMS (hereinafter referred to as an MSS set). The MSS is defined as a new CSS type, a USS, or a new search space other than the CSS/USS.

The BS configures a UE common or UE specific CORSET/SS set for multiple UEs of a group such as a CORSET/SS set for a service/group for transmission or retransmission of a broadcast and multicast Transport Block (TB), and performs transmission or retransmission of the same TB through both the CORSET/SS set for the service/group and the UE common or UE specific CORSET/SS set or through one of the two CORSET/SS sets depending on the situation.

The UE common SS set is a Type3 PDCCH CSS set, and the UE specific SS set is a USS.

One MSS set configured by the BS has the following mapping relationship.

One or more MBMS channels may be mapped to one MSS set. For example, one or more MCCHs or MTCHs are mapped to one MSS set.
An MBMS control information message or an MBMS system information block (MBMS SIB) may be mapped to one MSS set.
One or more MBMS services may be mapped to one MSS set. For example, one or more MBMS service IDs (e.g. TMGIs) are mapped to one MSS set.

One or more RNTI values may be mapped to one MSS set. For example, one or more G-RNTI values are mapped to one MSS set. Alternatively, one or more SC-RNTI values are mapped to one MSS set.

A BS that performs multicast/broadcast transmission through beamforming maps one G-RNTI, one MBMS service, or one MCCH/MTCH to a plurality of CORSET/MSS sets. For example, the BS maps one SSB block or one CSI-RS resource set to one CORSET/MSS set. Also, CORSET/MSS sets whose number is equal to or smaller than the total number of SSB blocks or the total number of CSI-RS resource sets provided by the BS are mapped to one G-RNTI, one MBMS service, or one MCCH/MTCH.

Alternatively, the BS may map one SSB block or one CSI-RS resource set to a plurality of CORSET/MSS sets. Alternatively, the BS may map a plurality of SSB blocks or a plurality of CSI-RS resource sets to one CORSET/MSS set.

When a cell is broadcasting an MBMS service, the BS may transmit SIB1, an MBMS system information block (SIB), one or more MCCHs, or one or more MTCHs. Here, the MCCH and the MTCH, which are logical channels, are transmitted on a physical channel, PDSCH, and are scheduled on the PDCCH. The MCCH carries MBMS control information, and one MTCH carries specific MBMS service data.

The BS provides a BWP for MBMS (i.e., MBMS BWP) to the UEs. MBMS BWPs may be divided into an MBMS SIB DL BWP and MBMS SIB UL BWP for MBMS SIB transmission/reception, an MCCH DL BWP and MCCH UL BWP for MCCH transmission/reception, and an MTCH DL BWP and MTCH UL BWP for MTCH transmission/reception. That is, one cell may provide zero or one or more MBMS DL BWPs and zero or one or more MBMS UL BWPs. Accordingly, the BS supporting the MBMS may provide all the above MBMS BWP types separately from the existing initial BWP or UE-dedicated BWP, or may provide zero or only some MBMS BWPs. Some or all MBMS BWPs may be the same as or different from the existing initial BWP, default BWP, first active BWP, or active BWP.

For example, the BS may transmit SIB 1 and MBMS SIB through the initial DL BWP, and transmit the PDCCH/PDSCH for MCCH channel and MTCH channel through the initial DL BWP or a separate DL BWP (hereinafter referred to as MBMS DL BWP). Alternatively, the MBMS SIB may also be transmitted through the MBMS SIB DL BWP. In addition, an MBMS SIB UL BWP for the UE to request the MBMS SIB in an on-demand manner may be separately configured.

The MBMS SIB may indicate separate MCCH DL/UL BWP configuration information for one or more MCCHs and PDCCH MSS set configuration information for transmitting the MCCH. In addition, the MBMS SIB or MBMS control information may indicate separate MTCH DL/UL BWP configuration information for one or more MTCHs and PDCCH MSS set configuration information for transmitting the MTCH.

The MBMS BWP configuration information includes information about the frequency position, bandwidth size, and subcarrier space (SCS) of the corresponding BWP. The MBMS BWP may be included in the same cell as the initial BWP, or may be included in a different cell (hereinafter, MBMS SCell). A UE intending to receive an MBMS service may receive a PDCCH/PDSCH carrying MCCH/MTCH data by configuring the MBMS BWP and MBMS SCell regardless of the RRC mode of the UE. The BS may transmit MBMS control information to the connected UE through UE-dedicated signaling.

The BS provides information of one or more DL BWP configurations through MBMS control information. Here, the DL BWP is one of the initial DL BWP, the MBMS DL BWP, or the active BWP of the UE. In this case, the MBMS DL BWP for MTCH data transmission/reception may be the MTCH DL BWP, and may be the same as or different from the MCCH DL BWP for MCCH data transmission/reception. In addition, a list of MBMS service IDs (e.g., TMGI list) for each DL BWP is provided. The BS informs the UE of the MBMS service ID transmitted through a specific DL BWP. The MBMS service ID is mapped to a specific MTCH, and the corresponding MBMS service data is transmitted on the PDSCH. The UE activates a DL BWP through which an MBMS service to be received is transmitted, and receives the MBMS service data through the DL BWP. The BS provides a G-RNTI mapped to the MBMS service ID. It informs whether HARQ feedback transmission for PDSCH transmission is enabled for each MBMS service ID. It provides PUCCH resource configuration information for HARQ feedback transmission or CSI transmission for MBMS for each MBMS service ID. It provides MBMS UL BWP configuration information for HARQ feedback transmission or CSI transmission for MBMS for each MBMS service ID. When the HARQ feedback transmission for the MBMS service is enabled, the UE intending to receive specific MBMS service data may activate the MBMS UL BWP mapped to the MBMS service, and transmit HARQ feedback through the MBMS UL BWP.

Receiving Side (e.g., UE):

In one embodiment of the present disclosure, the connected UE may monitor a PDCCH occasion based on the service/group dedicated RNTI (G-RNTI) through the CORSET/SS set for the service/group while monitoring a PDCCH occasion based on the UE common or UE dedicated RNTI (C-RNTI) through the UE common or UE specific CORSET/SS set, and may receive PDCCH/PDSCH based on the service/group dedicated RNTI or UE dedicated RNTI (C-RNTI) for a broadcast and multicast Transport Block (TB) according to the indication of the DCI.

The UE common SS set is a Type3 PDCCH CSS set, and the UE specific SS set is a USS.

For example, the BS may determine the number of UEs to receive a specific service or G-RNTI-based transmission based on information reported by the UEs. It may also determine the number of UEs to receive MBMS transmission through a specific TRP/beam. When only one UE is to receive the specific service or G-RNTI-based transmission, or only one UE is to receive MBMS transmission through the specific TRP/beam, MBMS scheduling may be performed through a UE specific search space (USS). When the UE is in the connected mode, the UE may monitor at least one USS or CSS Type 3. Accordingly, when there is one UE in the cell to receive the specific service or G-RNTI-based transmission, or there is only one UE to receive MBMS transmission through the TRP/beam, the BS may transmit, through the USS or CSS Type 3, DCI in which CRC is scrambled with the C-RNTI of a specific UE. Upon receiving the DCI, the UE may receive the MTCH TB on the PDSCH indicated by the DCI. In this case, the DCI may include an indicator indicating that the data is MBMS data rather than UE dedicated data on the PDSCH. For example, in the case of MCCH TB, an MCCH indicator may be included. In the case of MTCH TB, an MTCH indicator may be included. Alternatively, the MCCH TB and the MTCH TB received based on the C-RNTI may include an MCCH indicator or an MTCH indicator in the MAC header. Accordingly, the UE may determine whether the TB is a DCCH/DTCH TB or an MCCH/MTCH TB based on the indicator in the DCI/MAC header.

In detail, the BS provides search space set configuration information mapped to the MBMS service ID. The BS maps one or more MBMS service IDs to a specific MBMS search space set. In an embodiment of the present disclosure, the MSS is defined as a new type of CSS, a USS, or a new search space other than the CSS/USS. The UE activates the DL BWP through which the MBMS service to be received is transmitted, and monitors the PDCCH through a specific MSS set mapped to the MBMS service.

For the specific MSS set, the BS provides a plurality of CORSET/MSS sets for a plurality of beams/TRPs/TCI states to the UE. In order to receive the specific MBMS service data (i.e., broadcast/multicast TBs), the UE selects the best SSB index according to measurement of SS/PBCH blocks of a serving cell, selects a TCI state therefor, and monitors the CORSET/MSS set mapped to the selected TCI state. The UE monitors the PDCCH through an MSS mapped to the selected TCI state, and receives the DCI in which the CRC is scrambled with the G-RNTI mapped to the service. The UE receives the PDSCH transmission indicated by the DCI and receives the MBMS service data. The DCI for the G-RNTI may indicate HARQ feedback on PUCCH or PUSCH. When the DCI indicates HARQ feedback and HARQ feedback transmission for the corresponding MBMS service is enabled, the UE may activate the MBMS UL BWP mapped to the MBMS service, and transmit the HARQ feedback through the MBMS UL BWP.

The connected UE may receive unicast TB transmission through the Type 3 PDCCH CSS or USS. The unicast TB is composed of data of a logical channel dedicated control channel/dedicated traffic channel (DCCH/DTCH). The BS may transmit broadcast/multicast TB through the Type 3 PDCCH CSS or USS. In this case the UE monitors the PDCCH occasion of the Type 3 PDCCH CSS or the USS using the C-RNTI. That is, DCI in which the CRC is scrambled with the C-RNTI is received through the PDCCH occasion.

C-RNTI DCI Method 1:

When the DCI includes the MBMS indicator, the UE determines the TB decoded from the PDSCH indicated by the DCI as the MCCH/MTCH TB. When the DCI does not include the MBMS indicator, the TB is determined to be a DCCH/DTCH TB. The MBMS indicator may be subdivided into an MCCH indicator indicating MCCH TB, and an MTCH indicator indicating MTCH TB. Alternatively, a specific DCI code point mapped to a service ID such as TMGI or G-RNTI may be used as the MBMS indicator. Alternatively, a specific DCI format identifier may be used as the MBMS indicator.

Table 5 shows an example of DCI information for C-RNTI based MCCH/MTCH TB scheduling.

TABLE 5

Identifier for DCI formats - 1 bits
DL BWP ID indicating MBMS BWP
Cell Index indicating a cell where the BWP of the above DL BWP ID is configured.
MCCH indicator indicating that MCCH SDU of a particular MCCH channel is included in the corresponding TB
MTCH indicator indicating that MTCH SDU of a particular MTCH channel is included in the corresponding TB
Frequency domain resource assignment TABLE 5-continued Time domain resource assignment
VRB-to-PRB mapping
Modulation and coding scheme
New data indicator - 1 bit
Redundancy version
HARQ process number - 4 bits
Downlink assignment index
TPC command for scheduled PUCCH
PUCCH resource indicator
PDSCH-to-HARQ_feedback timing indicator C-RNTI DCI Method 2:

In method 2, the UE decodes the TB from the PDSCH indicated by the DCI, and a specific field included in the MAC header of the TB indicates the MBMS indicator. The specific field or values of the specific field may be subdivided into an MCCH indicator indicating MCCH TB and an MTCH indicator indicating MTCH TB. Alternatively, the specific field or values of the specific field may be mapped to a service ID such as TMGI or G-RNTI. Alternatively, the TB may include a specific TMGI or a specific G-RNTI in the MAC header or MAC CE.

Accordingly, the UE may determine whether the TB is an MCCH/MTCH TB (i.e., a service/group dedicated TB) or another UE dedicated TB by using method 1 and method 2 above.

Figure 8:
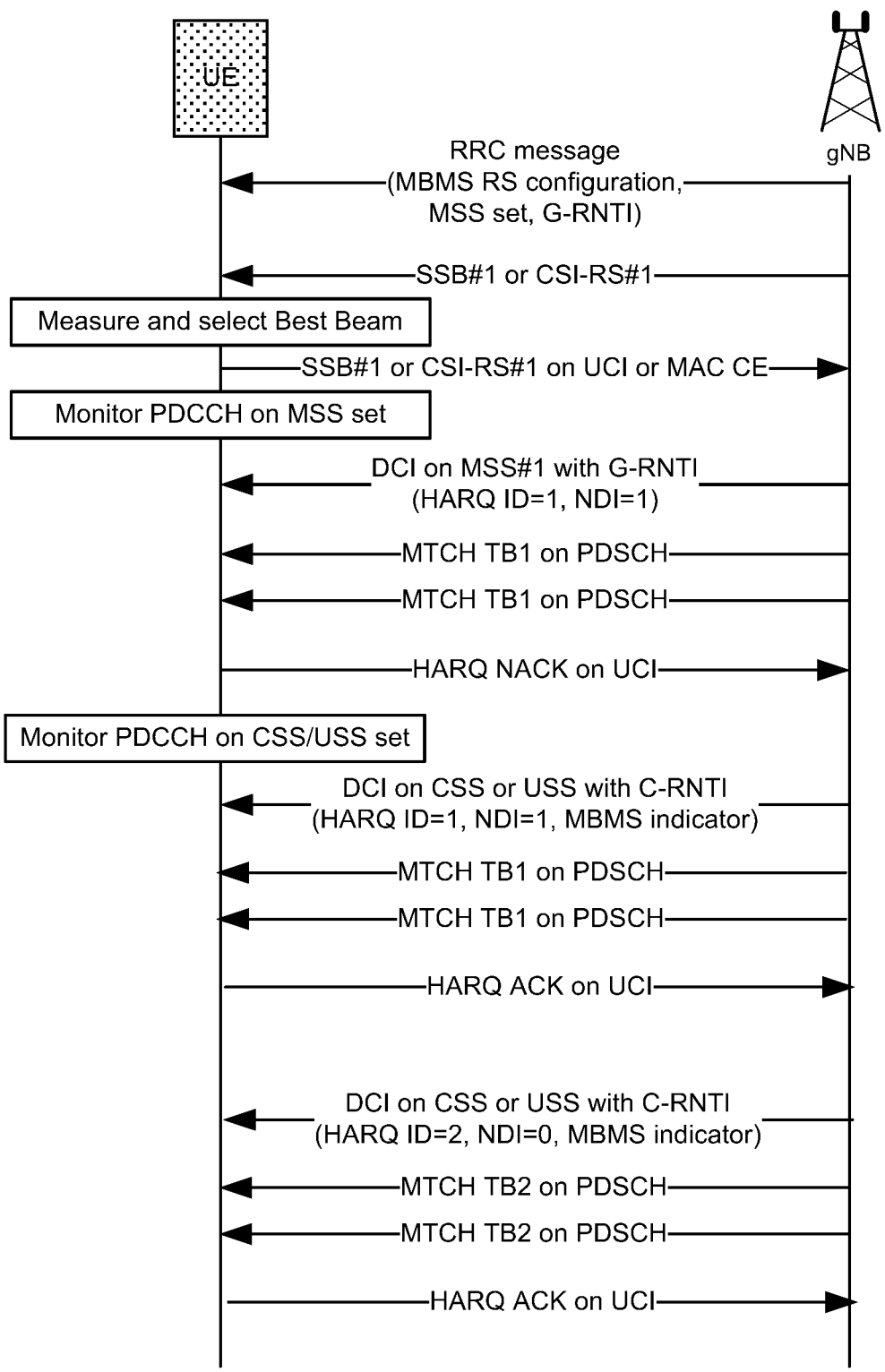
FIG. 8 illustrates a broadcast or multicast according to an embodiment of the present disclosure.

FIG. 8 illustrates signal transmission and reception, for example, C-RNTI-based broadcast or multicast according to an embodiment of the present disclosure.

Since a connected mode UE performs beam management (BM), the BS and the UE know and manage the optimal beam for the UE. In this case, depending on the MBMS transmission method of the BS, the TCI state of the UE selected through the current BM operation may be applied to not only unicast PDSCH reception but also broadcast/multicast PDSCH (i.e., MBMS PDSCH) reception. In this case, the BS notifies the UE or an MBMS UE in the cell, through system information, MCCH channel, or UE-dedicated signal, that the optimal TCI state selected through the current BM operation may be used for MBMS TB reception.

However, depending on the MBMS transmission method of the BS, the TCI state determined by the best SSB index of the serving cell or the BM of the connected UE may not be suitable for MBMS reception. In this case, the BS may provide a separate MBMS RS for MBMS. For example, when the MBMS BWP is configured separately, the BS may configure MBMS dedicated SSB resources or CSI-RS resources in or near the MBMS BWP in the frequency domain for idle/inactive/connected UEs that receive MBMS transmission through the MBMS BWP.

For example, the UE may receive MBMS control information through an MCCH channel or a UE-dedicated signal, and then receive an SSB resource set list including SSB resources used for the MBMS from the BS. Here, the SSB resource set may be configured as {SSBx1, SSBx2, SSBx3, SSBx4,}. The SSB index may be defined as 0 to 63. The SSB resource set list or a specific SSB resource set may be configured to be related to one or more G-RNTIs or one or more BWPs for MBMS, one or more MBMS cells, one or more MCCH channels, one or more MTCH channels, or one or more MBMS service IDs (e.g., one or more TMGIs).

The UE measures and selects the best SSBRI and L1-RSRP corresponding thereto. Alternatively, it measures and selects one or more SSBRIs greater than or equal to a specific threshold and L1-RSRP corresponding thereto. Alternatively, it selects a CSI-RS resource having a QCL relationship with the selected SSBRI. Alternatively, the UE measures and selects the best CRI and L1-RSRP corresponding thereto. Alternatively, it measures and selects one or more CRIs greater than or equal to a specific threshold and L1-RSRP corresponding thereto. The UE attempts to receive the MBMS TB based on the selected SSBRI or CRI.

The UE indicates SSBRI=1 to the BS. Accordingly, the BS determines the optimal TCI state 1 for the UE. When UE1 is in the connected mode, the BS determines the optimal TCI state 1 for the UE through the BM procedure.

The BS may transmit the same MTCH TB to multiple UEs including the UE. The BS indicates HARQ process ID=1 and NDI=1 in DCI for the first transmission of the MTCH TB. The UE monitors a PDCCH occasion through the CORSET/MSS set of TCI state 1, and receives DCI in which the CRC is scrambled with the G-RNTI. Upon receiving the PDSCH transmission based on the DCI, the UE may perform soft combining in a first HARQ process.

In the case where the UE reports HARQ NACK and all other UEs except the UE report HARQ ACK, the BS retransmits the MTCH TB based on the C-RNTI. In this operation, the BS transmits DCI through CSS Type 3 or the USS. Here, the CRC of the DCI is scrambled with the C-RNTI. The DCI includes the same HARQ process ID=1 and NDI=1, an MBMS indicator, etc. The UE monitors a PDCCH occasion through CSS Type 3 or the USS together with the MSS. When the CRC in the received DCI is scrambled with the C-RNTI, the UE receives a PDSCH indicated by the DCI. Since the DCI includes the HARQ process ID of the same value, the NDI of the same value, and the MBMS indicator, the UE may perform soft combining on the TB received through the PDSCH in the first HARQ process.

Thereafter, if the TB is successfully decoded, HARQ ACK may be transmitted. Otherwise, HARQ NACK may be transmitted. In case of NACK, the BS and UE may transmit/receive TB retransmission with the MSS set and G-RNTI, or may transmit/receive TB retransmission with the CSS/USS set and C-RNTI. Even in this case, HARQ process ID should have the same value and NDI should also have the same value.

When the BS transmits the same TB to multiple UEs, it may select a UE-dedicated RNTI and/or a service/group dedicated RNTI according to HARQ feedback reception or the selected optimal beam/TRP to perform transmission or retransmission of a multicast/broadcast service TB. Thereby, multicast/broadcast services may be efficiently provided for connected UEs.

Figure 9:
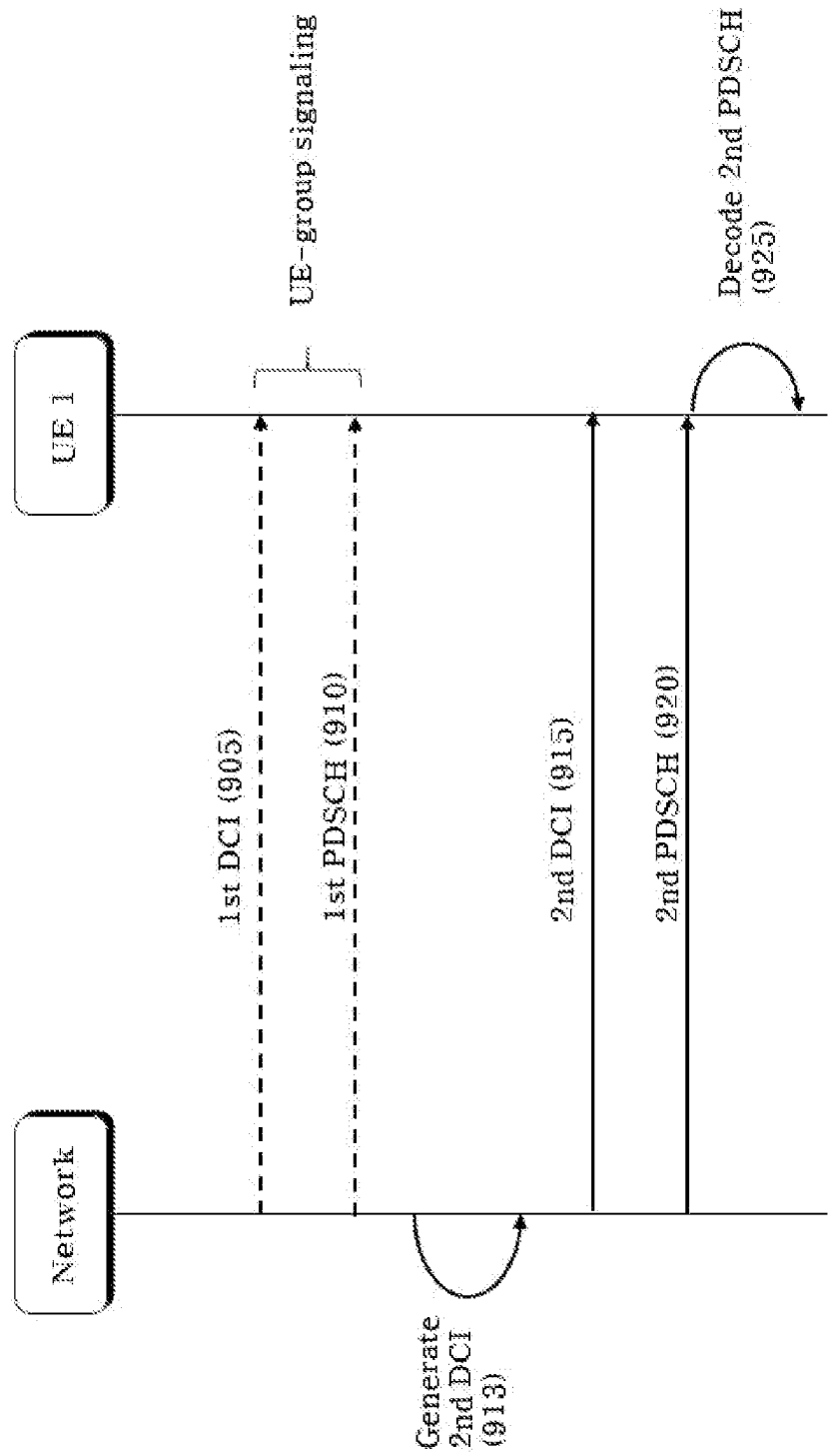
FIG. 9 illustrates a signal transmission/reception method according to an embodiment of the present disclosure.

FIG. 9 illustrates a signal transmission/reception method according to an embodiment of the present disclosure.

The BS may transmit, based on a first radio network temporary identifier (RNTI) for a UE-group, first downlink control information (DCI) including a first hybrid automatic repeat request (HARQ) process ID field and a first new data indicator (NDI) field to the UE-group (905). UE1 belonging to the UE-group may receive the first DCI including the first HARQ process ID field and the first NDI field based on the first RNTI for the UE-group.

The BS may transmit a first physical downlink shared channel (PDSCH) scheduled by the first DCI to the UE-group (910). UE1 may receive the first PDSCH scheduled by the first DCI.

The BS may transmit, based on an acknowledgment (ACK) for the data block of the first PDSCH not being received from UE1, second DCI to the UE1 based on a second RNTI dedicated to UE1 (915). Based on the data block of the first PDSCH not being successfully decoded, UE1 may receive the second DCI based on the second RNTI dedicated to UE1.

The BS may transmit a second PDSCH scheduled by the second DCI to UE1 (920). UE1 may receive the second PDSCH scheduled by the second DCI.

Based on the second PDSCH including retransmission for the data block of the first PDSCH, the BS may set a second HARQ process ID field included in the second DCI to the same HARQ process as the first HARQ process ID field included in the first DCI and set a second NDI field included in the second DCI to a value of the first NDI field included in the first DCI, wherein a cyclic redundancy check (CRC) of the second DCI may be scrambled with the second RNTI different from the first RNTI used for scrambling of a CRC of the first DCI (913).

Based on that the second HARQ process ID field included in the second DCI indicates the same HARQ process as the first HARQ process ID field included in the first DCI, and the value of the second NDI field included in the second DCI is equal to the value of the first NDI field included in the first DCI, UE1 may decode a data block of the second PDSCH, by assuming that the second PDSCH includes retransmission for the data block of the first PDSCH that has not been successfully decoded, even though the second RNTI is different from the first RNTI (925). UE1 may perform soft combining of the data block of the second PDSCH and the data block of the first PDSCH that is not successfully decoded.

The first RNTI may be a group-RNTI (G-RNTI), and the second RNTI may be a cell-RNTI (C-RNTI) for uniquely identifying UE1 in a cell.

The CRC of the first DCI may be scrambled with the G-RNTI, and the CRC of the second DCI may be scrambled with the C-RNTI.

The first DCI and the second DCI may be transmitted/received through physical downlink control channels (PDCCHs) of different search spaces.

Each of the data blocks may be a transport block (TB) or a code block group (CBG).

Figure 10:
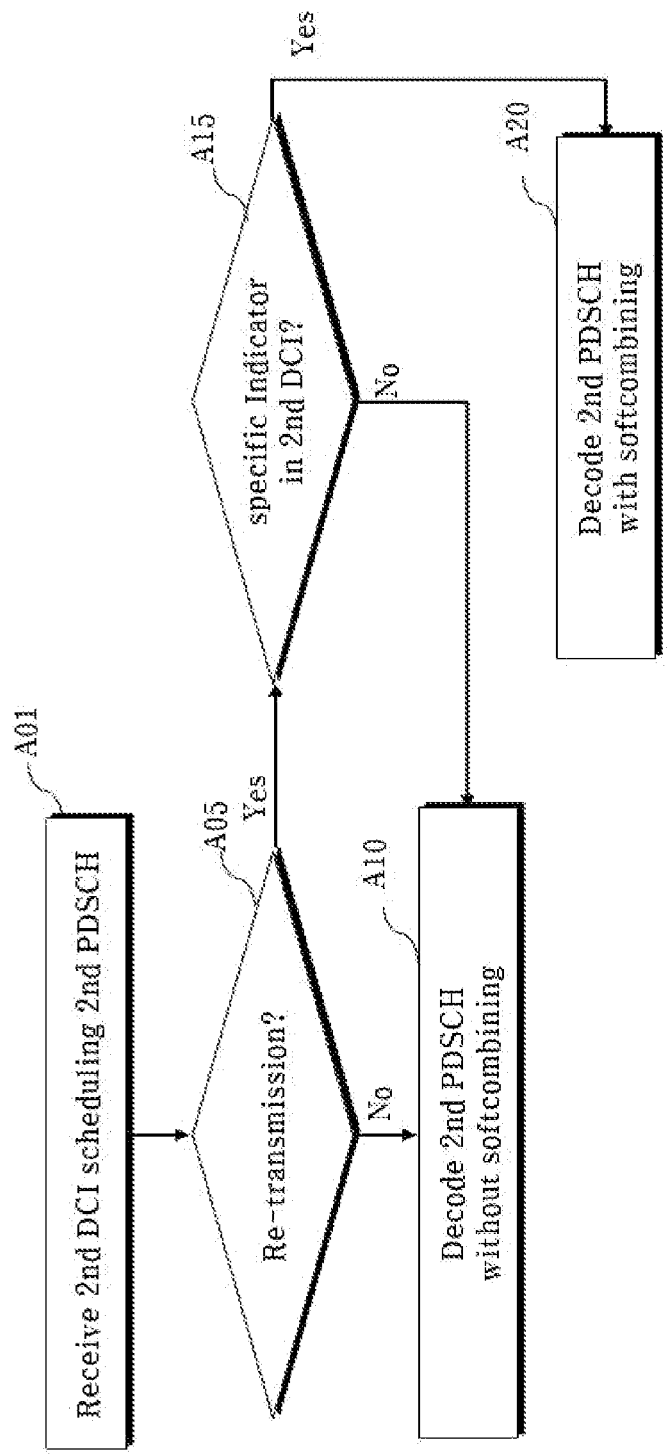
FIG. 10 illustrates a soft combining method related to an HARQ process according to an embodiment of the present disclosure.

FIG. 10 illustrates a soft combining method related to an HARQ process according to an embodiment of the present disclosure. The soft combining method illustrated in FIG. 10 may disclose the decoding of the second PDSCH (925) shown in FIG. 9 in more detail or may be applicable to the decoding of the second PDSCH (925). However, the application of soft combining of FIG. 10 is not limited to FIG. 9.

Hereinafter, it is assumed that the first PDSCH is scheduled by the first DCI and the second PDSCH is scheduled by the second DCI.

The UE determines whether the second PDSCH is for retransmission for the data block of the first PDSCH that has not been successfully decoded (A05). For example, based on that the second HARQ process ID field included in the second DCI indicates the same HARQ process as the first HARQ process ID field included in the first DCI, and the value of the second NDI field included in the second DCI is equal to the value of the first NDI field included in the first DCI, the UE may determine that the second PDSCH includes retransmission for the data block of the first PDSCH that has not been successfully decoded, even though the second RNTI is different from the first RNTI.

When the second PDSCH does not correspond to the retransmission, the UE may decode the second PDSCH without soft combining with the data block of the first PDSCH pre-stored in the buffer (A10).

When the second PDSCH corresponds to the retransmission, the UE checks whether a specific indicator is included in the second DCI (A15). The UE may determine whether to soft-combine the data block of the second PDSCH with the data block of the first PDSCH according to whether the specific indicator is included in the second DCI.

Based on the second DCI including the specific indicator, the UE may perform soft combining of the data block of the second PDSCH and the data block of the first PDSCH that has not been successfully decoded (A20).

Soft combining may be performed only when the specific indicator is included in the second DCI. Based on the second DCI not including the specific indicator, the UE may decode the data block of the second PDSCH without soft combining between the data block of the second PDSCH and the data block of the first PDSCH, even if the second PDSCH includes the retransmission for the data block of the first PDSCH that has not been successfully decoded (A10).

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 11:
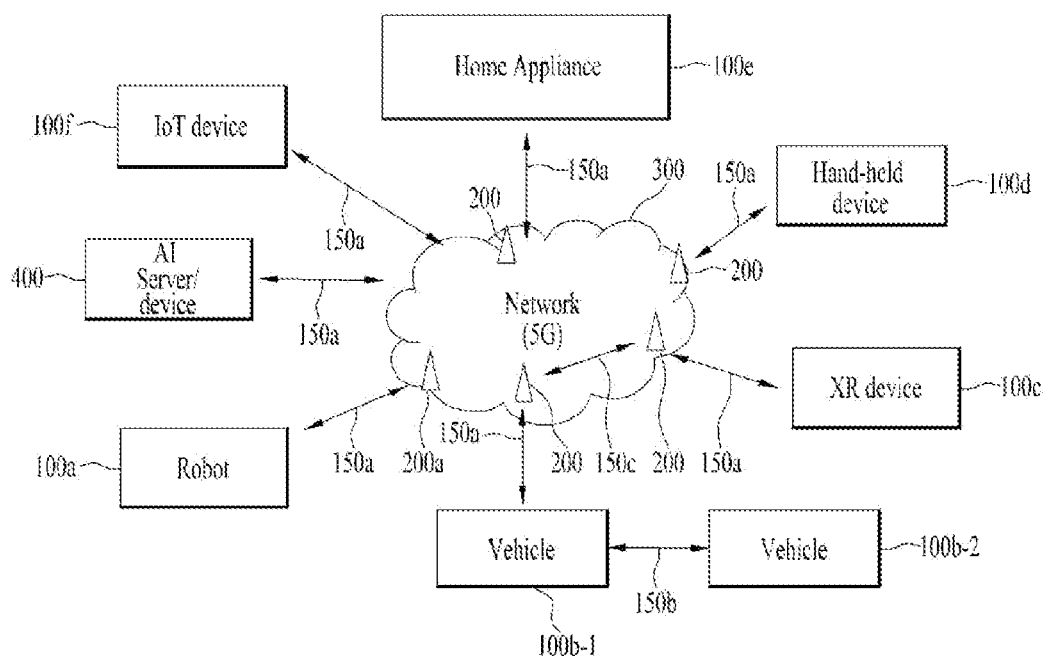
FIGS. 11 to 14 illustrate a communication system 1 and a wireless device applicable to the present disclosure.

FIG. 11 illustrates a communication system 1 applied to the present disclosure.

Referring to FIG. 11, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 12:
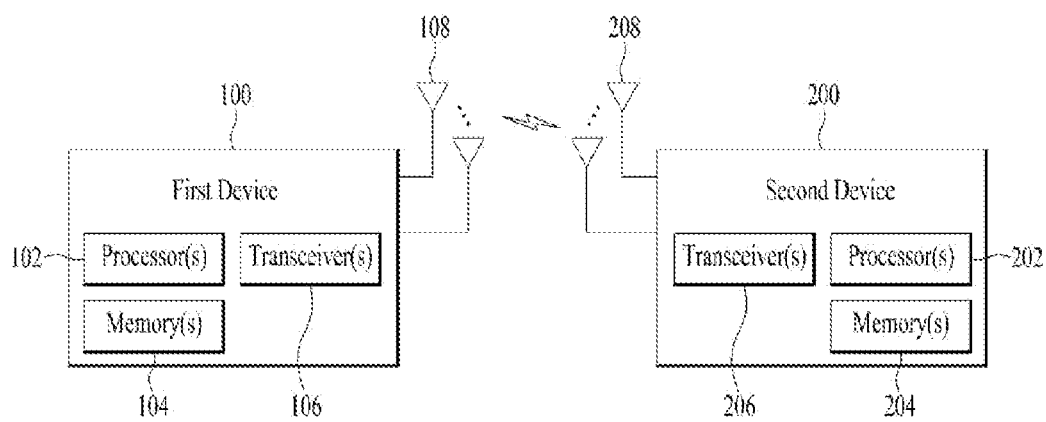

FIG. 12 illustrates wireless devices applicable to the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 13:
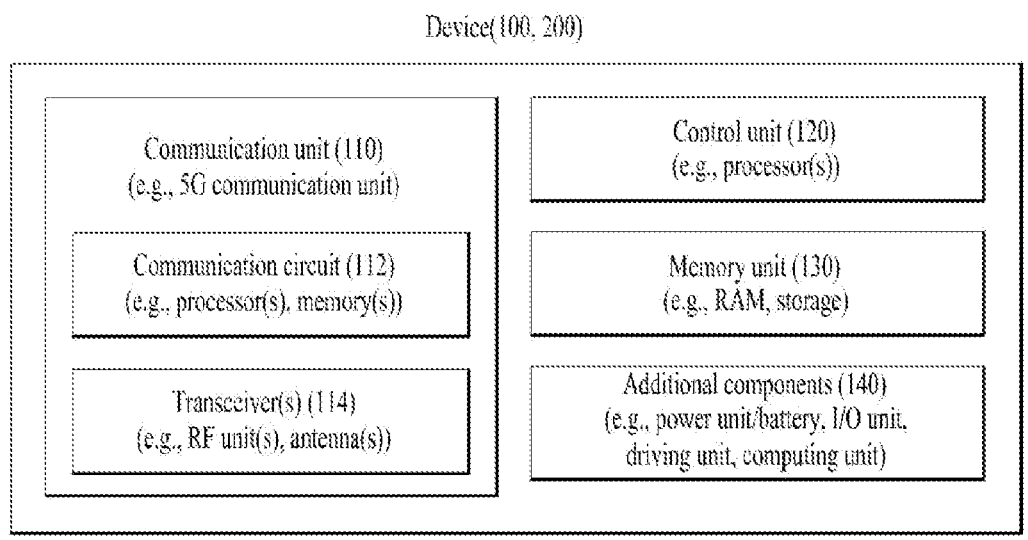

FIG. 13 illustrates another example of a wireless device applied to the present disclosure. The wireless device may be implemented in various forms according to a use-case/service (refer to FIG. 11).

Referring to FIG. 13, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 14:
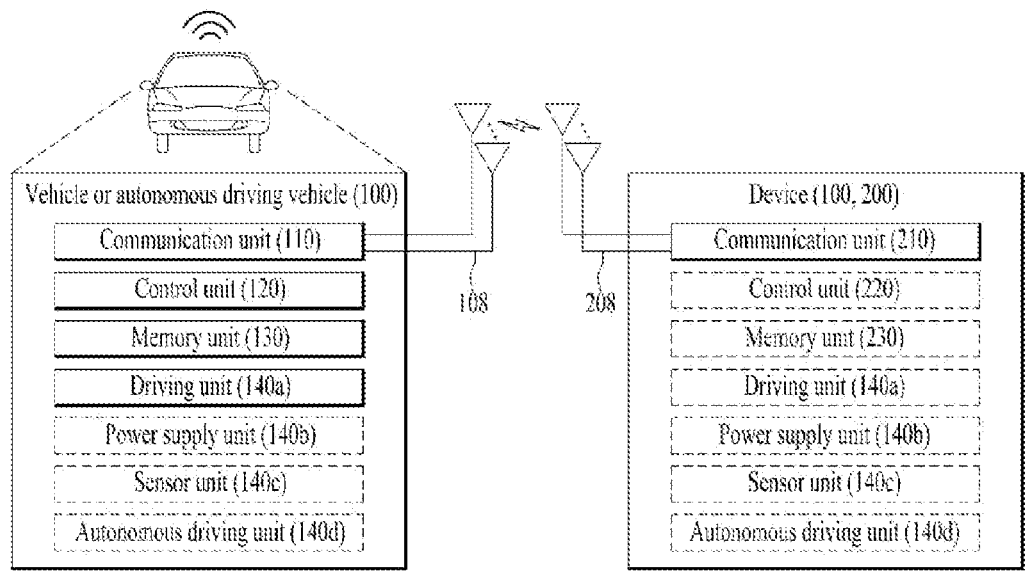

FIG. 14 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 15:
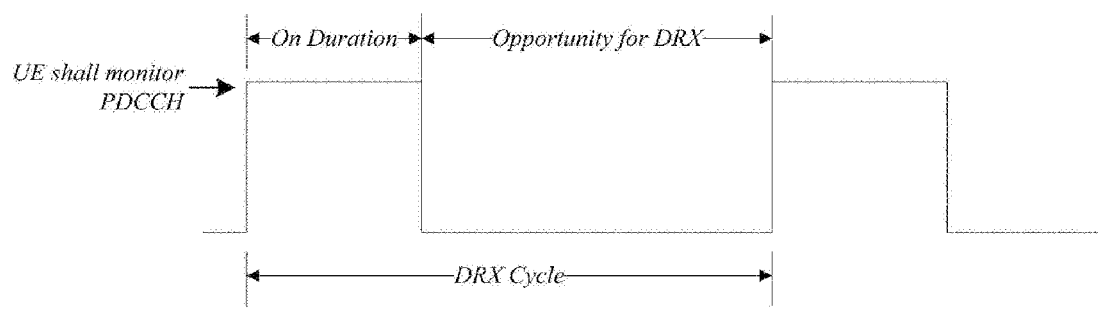
FIG. 15 illustrates a discontinuous reception (DRX) operation applicable to the present disclosure.

FIG. 15 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 15, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 6

| | Type of signals | UE procedure |
| --- | --- | --- |
| 1st step | RRC signalling (MAC-CellGroupConfig) | Receive DRX configuration information |

TABLE 6-continued

| | Type of signals | UE procedure |
| --- | --- | --- |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method for receiving a signal by a user equipment (UE) in a wireless communication system supporting multicast broadcast services (MBSs), the method comprising:
    receiving, through radio resource control (RRC) signaling, configuration information including first information regarding a group-radio network temporary identifier (G-RNTI), and second information regarding whether a hybrid automatic repeat request (HARQ) feedback for multicast is enabled;
    receiving, through a physical downlink control channel (PDCCH) based on the G-RNTI, first downlink control information (DCI) including a first hybrid automatic repeat request (HARQ) process ID field and a first new data indicator (NDI) field;
    receiving a first physical downlink shared channel (PDSCH) scheduled by the first DCI;
    transmitting HARQ-acknowledgement (ACK) information for the first PDSCH;
    receiving, based on a cell-RNTI (C-RNTI), second DCI including a second HARQ process ID field and a second NDI field; and
    receiving a second PDSCH scheduled by the second DCI,
    wherein, based on the second HARQ process ID field, and the second NDI field, the UE determines that the second PDSCH scheduled based on the C-RNTI provides a retransmission of the first PDSCH scheduled based on the G-RNTI,
    wherein the second information informs the UE that the HARQ-feedback for multicast is DCI-dependently enabled for a MBS associated with the G-RNTI, and
    wherein the HARQ-ACK information is provided for only the first PDSCH scheduled by the first DCI, based on (i) the HARQ-feedback for multicast being DCI-dependently enabled through the second information of the RRC message, and (ii) an indicator in the first DCI of the PDCCH indicates enabling of the HARQ-ACK feedback for the first PDSCH.

2. The method of claim 1, wherein whether or not the HARQ-feedback for multicast is enabled, is indicated per each G-RNTI.

3. The method of claim 1, wherein a cyclic redundancy check (CRC) of the first DCI is scrambled with the G-RNTI, and a CRC of the second DCI is scrambled with the C-RNTI.

4. The method of claim 1, wherein the first DCI and the second DCI are received through different search spaces.

5. The method of claim 1, wherein the UE performs soft combining of the second PDSCH with the first PDSCH.

6. The method of claim 1, wherein the UE performs soft combining of the second PDSCH with the first PDSCH, based on the second DCI including a specific indicator.

7. The method of claim 6, wherein the soft combining is performed only when the specific indicator is included in the second DCI.

8. The method of claim 1, wherein the UE decodes the second PDSCH without soft combining of the second PDSCH with the first PDSCH, based on that the second DCI does not include a specific indicator.

9. The method of claim 1, wherein each PDSCH includes a transport block (TB) or a code block group (CBG).

10. A user equipment (UE) for receiving a signal in a wireless communication system supporting multicast broadcast services (MBSs), the UE comprising:
    a transceiver; and
    a processor configured to control the transceiver to:
    receive, through radio resource control (RRC) signaling, configuration information including first information regarding a group-radio network temporary identifier (G-RNTI), and second information regarding whether a hybrid automatic repeat request (HARQ) feedback for multicast is enabled;
    receive, through a physical downlink control channel (PDCCH) based on the G-RNTI, first downlink control information (DCI) including a first hybrid automatic repeat request (HARQ) process ID field and a first new data indicator (NDI) field;
    receive a first physical downlink shared channel (PDSCH) scheduled by the first DCI;
    transmit HARQ-acknowledgement (ACK) information for the first PDSCH;
    receive, based on a cell-RNTI (C-RNTI), second DCI including a second HARQ process ID field and a second NDI field; and
    receive a second PDSCH scheduled by the second DCI,
    wherein, based on the second HARQ process ID field and the second NDI field, the processor determines that the second PDSCH scheduled based on the C-RNTI provides a retransmission of the first PDSCH scheduled based on the G-RNTI,
    wherein the second information informs the UE that the HARQ-feedback for multicast is DCI-dependently enabled for a MBS associated with the G-RNTI, and
    wherein the HARQ-ACK information is provided for only the first PDSCH scheduled by the first DCI, based on (i) the HARQ-feedback for multicast being DCI-dependently enabled through the second information of the RRC message, and (ii) an indicator in the first DCI of the PDCCH indicates enabling of the HARQ-ACK feedback for the first PDSCH.

11. A method for transmitting a signal by a base station in a wireless communication system supporting multicast broadcast services (MBSs), the method comprising:
    transmitting, through radio resource control (RRC) signaling, configuration information including first information regarding a group-radio network temporary identifier (G-RNTI), and second information regarding whether a hybrid automatic repeat request (HARQ) feedback for multicast is enabled;
    transmitting, through a physical downlink control channel (PDCCH) based on the G-RNTI, first downlink control information (DCI) including a first hybrid automatic repeat request (HARQ) process ID field and a first new data indicator (NDI) field;
    transmitting a first physical downlink shared channel (PDSCH) scheduled by the first DCI;
    receiving HARQ-acknowledgement (ACK) information for the first PDSCH;
    transmitting, based on a cell-RNTI (C-RNTI), second DCI including a second HARQ process ID field and a second NDI field; and
    transmitting a second PDSCH scheduled by the second DCI,
    wherein, based on the second HARQ process ID field and the second NDI field, the second PDSCH scheduled based on the C-RNTI provides a retransmission of the first PDSCH scheduled based on the G-RNTI,
    wherein the second information informs a user equipment that the HARQ-feedback for multicast is DCI-dependently enabled for a MBS associated with the G-RNTI, and wherein the HARQ-ACK information is provided for only the first PDSCH scheduled by the first DCI, based on (i) the HARQ-feedback for multicast being DCI-dependently enabled through the second information of the RRC message, and (ii) an indicator in the first DCI of the PDCCH indicates enabling of the HARQ-ACK feedback for the first PDSCH.

12. A base station for transmitting a signal in a wireless communication system supporting multicast broadcast services (MBSs), the base station comprising:
   a transceiver; and
   a processor configured to control the transceiver to:
   transmit, through radio resource control (RRC) signaling, configuration information including first information regarding a group-radio network temporary identifier (G-RNTI), and second information regarding whether a hybrid automatic repeat request (HARQ) feedback for multicast is enabled;
   transmit, through a physical downlink control channel (PDCCH) based on the G-RNTI, first downlink control information (DCI) including a first hybrid automatic repeat request (HARQ) process ID field and a first new data indicator (NDI) field;
   transmit a first physical downlink shared channel (PDSCH) scheduled by the first DCI;
   receive HARQ-acknowledgement (ACK) information for the first PDSCH;
   transmit, based on a cell-RNTI (C-RNTI), second DCI including a second HARQ process ID field and a second NDI field; and
   transmit a second PDSCH scheduled by the second DCI,
   wherein, based on the second HARQ process ID field and the second NDI field, the second PDSCH scheduled based on the C-RNTI provides a retransmission of the first PDSCH scheduled based on the G-RNTI,
   wherein the second information informs a user equipment that the HARQ-feedback for multicast is DCI-dependently enabled for a MBS associated with the G-RNTI, and
   wherein the HARQ-ACK information is provided for only the first PDSCH scheduled by the first DCI, based on (i) the HARQ-feedback for multicast being DCI-dependently enabled through the second information of the RRC message, and (ii) an indicator in the first DCI of the PDCCH indicates enabling of the HARQ-ACK feedback for the first PDSCH.

* * * * *